United States Patent
Atkinson

(10) Patent No.: US 6,233,691 B1
(45) Date of Patent: May 15, 2001

(54) APPARATUS FOR REDUCING COMPUTER SYSTEM POWER CONSUMPTION

(75) Inventor: Lee Warren Atkinson, Houston, TX (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/480,101

(22) Filed: Jan. 10, 2000

Related U.S. Application Data

(63) Continuation of application No. 08/166,609, filed on Dec. 13, 1993, now Pat. No. 6,029,249, which is a continuation of application No. 07/809,301, filed on Dec. 17, 1991, now abandoned.

(51) Int. Cl.$^7$ ....................................... G06F 1/32
(52) U.S. Cl. ............................ 713/323; 713/322
(58) Field of Search .................. 713/300, 320, 713/321–323, 501, 600; 709/100; 710/1; 340/636; 307/66

(56) References Cited

U.S. PATENT DOCUMENTS

| | | | |
|---|---|---|---|
| 4,317,181 | 2/1982 | Teza et al. | 364/707 |
| 4,670,837 | 6/1987 | Sheets | 364/200 |
| 4,698,748 | 10/1987 | Juzswik et al. | 364/200 |
| 4,819,164 | 4/1989 | Branson | 364/200 |
| 4,980,836 | 12/1990 | Carter et al. | 364/483 |
| 5,142,684 | * 8/1992 | Perry et al. . | |
| 5,167,024 | 11/1992 | Smith et al. | 395/375 |
| 5,487,181 | * 1/1996 | Dailey et al. . | |
| 5,655,127 | * 8/1997 | Rabe et al. . | |
| 6,029,249 | * 2/2000 | Atkinson . | |

FOREIGN PATENT DOCUMENTS

| | | |
|---|---|---|
| 0451661 | 10/1991 | (EP) . |
| 2151950 | 6/1990 | (JP) . |

OTHER PUBLICATIONS

Intel Corp., *386 SL Microprocessor Superset, System Design Guide*, Chapter 14 "System and Power Management," 14–1 to 14–23, 1990.

Intel Corp., *396 SL Microprocessor Superset, Programmers Reference Manual*, Chapter 6 "Systems and Power Management," pp. 6–1 to 6–50; 10–4 to 10–7, 1990.

Technique for Monitoring a Computer System's Activity for the Purpose of Power Management of a DOS–Compatible System, IBM Technical Disclosure Bulletin, vol. 33, No. 4, Sep. 1990, pp. 474–477.

* cited by examiner

Primary Examiner—Gopal C. Ray
(74) Attorney, Agent, or Firm—Akin, Gump, Strauss, Hauer & Feld, LLP

(57) ABSTRACT

A battery powered computer system determines when the system is not in use by monitoring various events associated with the operation of the system. The system preferably monitors the number of cache read misses and write operations, i.e., the cache hit rate, and reduces the system clock frequency when the cache hit rate rises above a certain level. When the cache hit rate is above a certain level, then it can be assumed that the processor is executing a tight loop, such as when the processor is waiting for a key to be pressed and then the frequency can be reduced without affecting system performance. Alternatively, the apparatus monitors the occurrence of memory page misses, I/O write cycles or other events to determine the level of activity of the computer system.

23 Claims, 4 Drawing Sheets

APPARATUS FOR REDUCING COMPUTER SYSTEM POWER CONSUMPTION

RELATED APPLICATIONS

This application is a continuation of U.S. application Ser. No. 08/166,609, filed Dec. 13, 1993, U.S. Pat. No. 6,029,249, which is a continuation of U.S. application Ser. No. 07/809,301, filed Dec. 17, 1991, abandoned.

BACKGROUND OF THE INVENTION

1. Field of the Invention

The invention relates to battery powered computer systems, and more particularly, to circuits and methods for reducing the power consumption of the computer system.

2. Description of the Prior Art

Portable computer systems are rapidly developing the capabilities of conventional desktop or floor mounted personal computer systems. Hard disk units are being integrated into portable computers because of the large amounts of information being processed and the large size of many application programs. A floppy disk unit is integrated in the vast majority of portable computers, even if a hard disk unit is installed, to allow loading of information and use of applications requiring key disks, and also to allow use of diagnostic programs. Modems have been integrated into portable computers for some time to allow communications and information transfer between the user and a remote location, for example, the home office. The displays in portable computer systems are becoming much more elaborate and readable. The pixel count on the standard liquid crystal displays (LCD's) utilized is increasing, as is the viewing angle. The use of backlighting allows use of LCD's in low light environments and improves the contrast ratio of the display. More complex circuitry is being installed in portable computers to support these improved peripheral devices and to support the increased speeds and capabilities of the microprocessors utilized in portable computer systems.

The various peripheral devices and high speed circuitry mentioned above consume large amounts of power when operating. This has resulted in problems in portable computer systems because these systems are generally desired to be used in locations where alternating current is not available. This has made it very difficult to provide all the possible functionality available and yet have an acceptable battery life when the portable computer system is battery powered. Using CMOS components helped reduce the power consumption of the circuitry, but even the use of CMOS components is insufficient at the clock speeds and performance levels of available circuitry. Therefore a dilemma arises whether to provide lesser functionality with longer battery life or greater functionality with lesser battery life or even no battery operation.

Various alternatives were tried to resolve the problem. For example, the International Business Machines (IBM) Corporation PC Convertible included a switch which the user could press to place the computer system in a standby mode. However, the PC convertible was relatively simple, with a low level of functionality as compared to what is currently available, and the requirement of a user action to reduce power consumption limited its use to circumstances where the user remembered to depress the switch. Blanking the display after a period of keyboard inactivity saved power as well as prolonged the life of the display and was widely utilized. A hard disk unit was developed which reduced the power used by the controlling electronics by utilizing only certain portions of the track for servo information and turning off the read channel circuitry until just before a servo burst was expected. Additionally, a programmable value could be provided to the hard disk unit so that after a given inactivity interval defined by this value, the hard disk unit was allowed to spin down and all but some interface circuitry was shut down. While these alternatives did provide some relief, they were not complete solutions to satisfactorily resolve the dilemma, and design tradeoffs still were forced to occur.

U.S. Pat. No. 4,980,836 to Carter et al. discloses an apparatus for reducing power consumption in computer systems. The apparatus monitors the address bus to determine when selected peripheral devices have not been accessed for a preset amount of time. When the preset amount of time has passed, the system powers itself down and disables the system clock, placing the system in a standby mode. The system clock could be stopped in this invention because the preferred embodiment of this invention used a static CMOS processor and chip set. If there was sufficient energy in the batteries, the system could be awakened by the user depressing a standby switch. Computer systems which do not use a static CMOS processor or chip set generally reduce the clock frequency when a preset amount of time of address bus inactivity has passed. Reducing the clock frequency during inactive periods reduces power consumption during this time. However, the frequency of peripheral device accesses is not a completely reliable indicator of inactivity of a computer system. Thus, in some instances the system clocking signal may be reduced in frequency or disabled during a period of high computer system activity. Therefore, a method is needed whereby other elements or events of the computer system can be monitored to more reliably determine the activity level of the computer system so that the system clock can properly be adjusted to reduce power consumption.

SUMMARY OF THE INVENTION

A battery powered computer system according to the present invention determines when the system is not in use by monitoring various events associated with the operation of the computer system. In the preferred embodiment, the system monitors the number of cache read misses and write operations, i.e., the cache hit rate, and reduces the system clock frequency when the cache hit rate rises above a certain level. When the cache read hit rate is above a certain level, then it can be assumed that the processor is executing a tight loop, such as when the processor is waiting for a key to be pressed. In an alternate embodiment of the invention, the system monitors other events in addition to, or instead of, the cache read hit rate, such as the occurrence of page hits or input/output (I/O) write cycles, to determine the level of activity of the computer system.

The system according to the preferred embodiment includes a frequency switching circuit, an event counter, and a periodic timer. The event counter is preferably used to measure the incidence of cache read misses and write operations and may also optionally be used to count the number of page misses and memory or I/O writes as desired. The event counter includes an overflow or carry line which prevents any further incrementing of the counter once the maximum number of counts is reached to prevent the counter from overflowing. The periodic timer instructs the CPU via a system interrupt to periodically monitor and compare the contents of the event counter. Every event increments the counter and, the more events, the more processor activity that is presumed. When the periodic timer issues a system interrupt, the CPU reads the contents of the counter and compares the event activity with a predetermined value. If the number of events is higher than the predetermined value, then the processor switches the operating frequency of the system to a high frequency if the system is not already operating at this high frequency. A lower event count causes the frequency switching circuit to switch to a lower frequency to conserve power if the system is not already operating at this low frequency.

The invention allows the battery powered operating period of a computer system to be greatly extended without requiring any input from the user and without any noticeable loss in processing power. This allows a battery powered computer system to have advanced capabilities and functionality while still having a satisfactory battery operating interval.

BRIEF DESCRIPTION OF THE DRAWINGS

A better understanding of the invention can be obtained when the following detailed description of the preferred embodiment is considered in conjunction with the following drawing in which.

DETAILED DESCRIPTION OF THE PREFERRED EMBODIMENT

Figure 1:
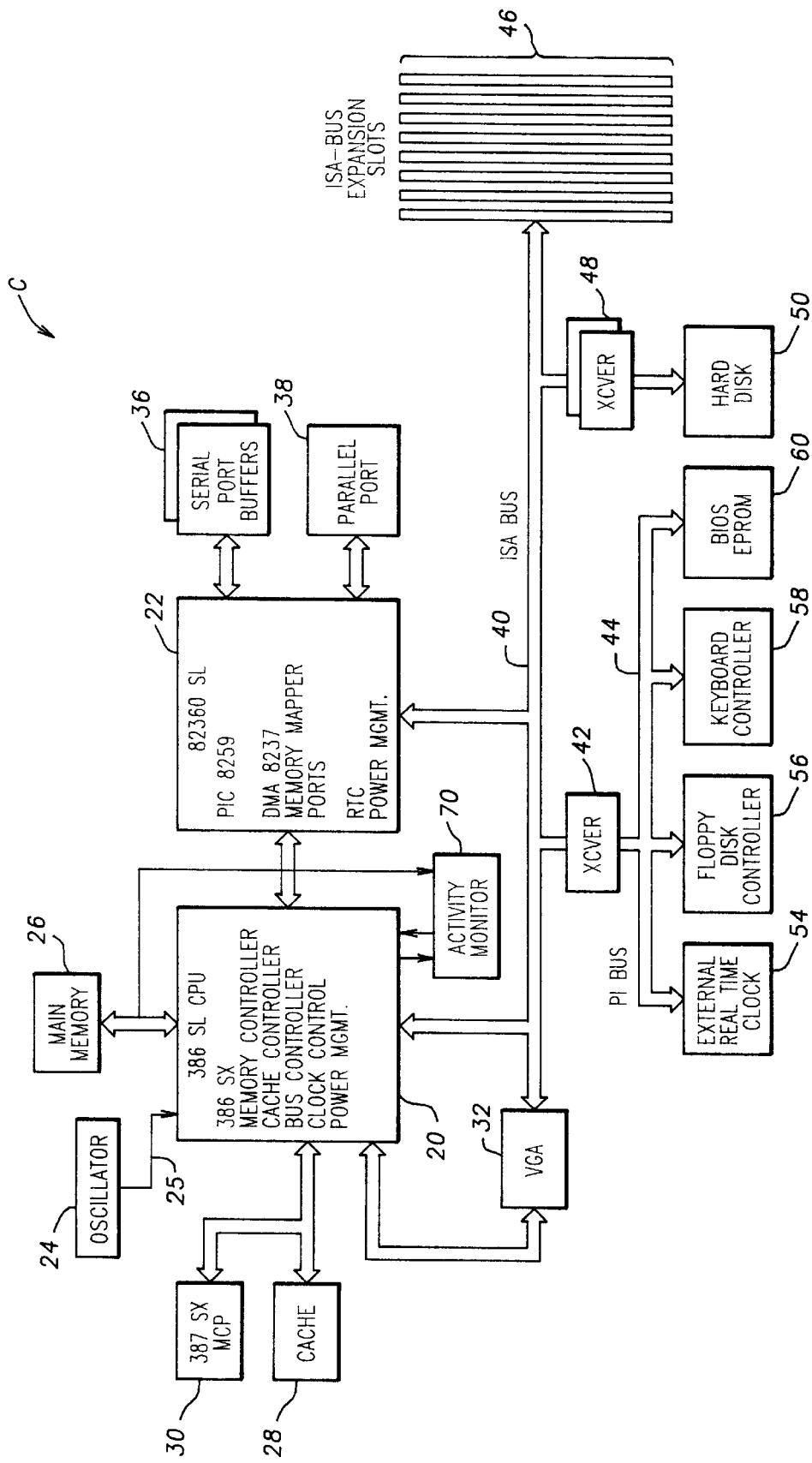
FIG. 1 is a schematic block diagram of a computer system incorporating the present invention.

Referring now to FIG. 1, a computer system C according to the preferred embodiment of the invention is shown. The computer system C is preferably based on the 386 SL chip set produced by Intel Corporation (Intel). The 386 SL chip set comprises two chips, a 386 SL CPU chip (CPU chip) 20 and a 82360 SL chip 22. The CPU chip 20 includes an 80386 SX microprocessor, a memory controller, a cache controller, a bus controller, clock control circuitry, and power management circuitry. The 82360 SL chip 22 includes a programmable interrupt controller (PIC), direct memory access (DMA) controller, a memory mapper, various ports, a real time clock (RTC) and power management circuitry. For more information on the 386 SL chip set, please see the Intel 386 SL Microprocessor Superset System Design Guide 1990 edition; the 386 SL Microprocessor Superset Programmers Reference Manual, 1990 edition; and the 386 SL Microprocessor Superset Data Book; all published by Intel.

An oscillator 24 is connected to the CPU chip 20. The oscillator preferably operates at 20 Megahertz (MHz) and provides a 20 MHz clocking signal 25 to the CPU chip 20. Main memory 26, cache memory 28 and a math coprocessor (MCP) 30 are also preferably coupled to the CPU chip 20. The math coprocessor 30 is preferably a 387 SX coprocessor produced by Intel. The cache memory is preferably operated as a write-through cache memory. A video graphics array (VGA) controller 32 is coupled to the CPU chip 20. Serial port buffers 36 and a parallel port 38 are coupled to the 82360 SL chip 22.

The CPU chip 20 and the 82360 SL chip 22 are each connected to an I/O bus 40 based on the industry standard architecture (ISA). However, other bus architectures are also contemplated. The ISA bus 40 is connected through a transceiver 42 to a peripheral interface (PI) bus 44. The VGA chip 32 is connected to the ISA bus 40. The ISA bus 40 may include a plurality of ISA bus expansion slots 46 if the present invention is used in a desktop computer system. The slots 46 are generally omitted in portable computers. The ISA bus 40 is connected through a transceiver 48 to a hard disk 50. Various logic is coupled to the PI bus 44, including an external real time clock 54, a floppy disk controller 56, a keyboard controller 58 and BIOS EPROM 60. The floppy disk controller 56 and keyboard controller 58 control operation of a floppy disk unit and keyboard, respectively (both not shown). The BIOS EPROM holds the basis input/output (I/O) system software as well as system-specific initialization and configuration software. This is an exemplary computer system and other designs and architectures could be utilized.

The CPU chip 20 includes an active high input referred to as the TURBO input (not shown). When the TURBO input receives a logic high signal, the CPU chip 20 enters "turbo mode," and the microprocessor executes at a clock speed defined by a bit field in a register in the CPU chip 20 referred to as the CPUWRMODE register (not shown). When the TURBO input receives a logic low signal, the CPU chip 20 enters "de-turbo mode" and executes at a reduced clock speed of ½ or ¼ as defined by a bit in a register. The CPUWRMODE register operates in conjunction with the power management circuitry inside the CPU chip 20 to control the frequency of the clocking signal 25 provided to the microprocessor. In the preferred embodiment, the turbo input receives a logic high value, and thus the CPUWRMODE register determines the frequency of the clocking signal 25 provided to the microprocessor.

Bits 5 and 4 of the CPUWRMODE register determine the speed with which the microprocessor clock operates. When bits 5 and 4 of the CPUWRMODE register are each set to 0, then the clock speed is the speed of the signal received by the oscillator 24, preferably 20 MHz. When bits 5 and 4 of the CPUWRMODE register are set to 0 and 1 respectively, the clock speed provided to the microprocessor is one half of the frequency of the signal received from the oscillator 24, i.e., 10 MHz. When bits 5 and 4 of the CPUWRMODE register are 1 and 0 respectively, the clock speed provided to the microprocessor is one fourth of the frequency of the signal received from the oscillator 24, i.e., 5 MHz. When bits 5 and 4 of the CPUWRMODE register each have a logic 1 value, then the clock speed provided to the CPU is one eighth the frequency of the signal received from the oscillator 24, i.e. 2.5 MHz.

The computer system C also includes activity monitor logic 70 according to the present invention which is coupled to the CPU chip 20. The activity monitor logic 70 receives signals from the CPU chip 20 as well as signals provided from the CPU chip 20 to the main memory 26. The activity monitor logic 70 monitors events associated with the microprocessor to determine the activity level of the system. In the preferred embodiment, the activity monitor logic 70 monitors the number of cache read misses and write operations during preset periods of time, and the CPU chip 20 reduces the system clock frequency when the cache hit rate rises above a certain level. When the cache read hit rate is above a certain level, then it can be assumed that the processor is executing a tight loop, such as when the processor is waiting for a key to be pressed. In this instance, the system clock frequency can be reduced to reduce power consumption without affecting system performance. In an alternate embodiment of the invention, the activity monitor logic 70 monitors other events such as page misses or memory and I/O write operations, among others. It is contemplated that the various types of events may be counted either individually or in combination.

Figure 2:
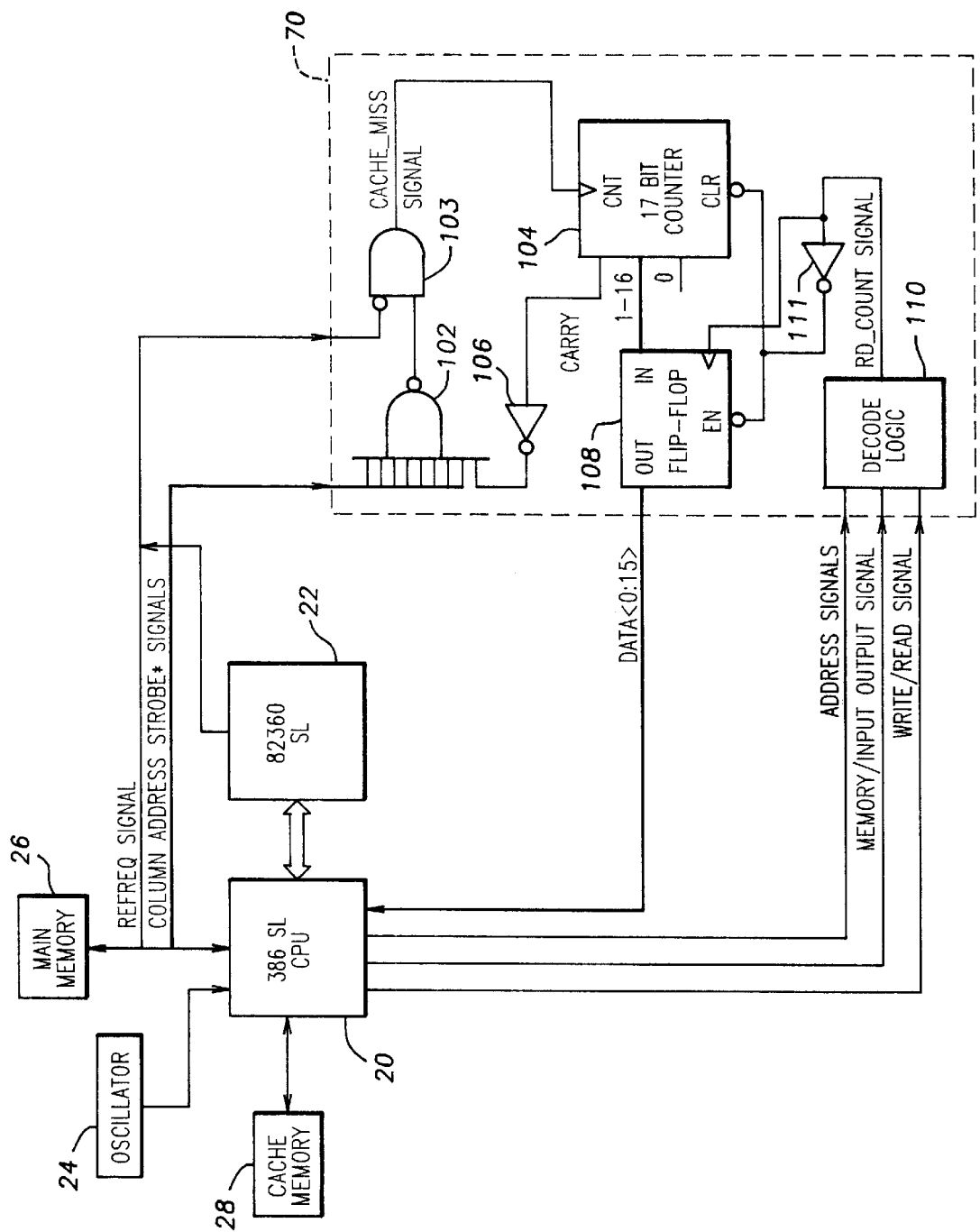
FIG. 2 is a more detailed schematic diagram of a portion of the computer system of FIG. 1.

Referring now to FIG. 2, the activity monitor logic 70 according to the preferred embodiment of the invention is shown. In the description that follows a signal name followed by an asterisk indicates that the signal is asserted when it has a logic low level. The activity monitor logic 70 receives column address strobe (CAS*) signals provided from the CPU chip 20 to the main memory 26. The CAS* signals are essentially memory select signals that are used in paged memory systems. When a cache read hit occurs, the requested data can be provided directly from the cache memory 28 to the microprocessor, and no CAS* signals are asserted by the CPU chip 20. Also, since the cache memory is operated as a write-through cache, each write operation, whether it be a write hit or write miss, requires a memory cycle to the main memory 26. Therefore, the CAS* signals are asserted on all write operations in the preferred embodiment. Thus, the CAS* signals are used to determine when cache read miss operations and write operations occur, i.e., when main memory cycles occur.

In the preferred embodiment, the CPU chip 20 generates eight CAS* signals. The CAS* signals are provided to eight inputs of a nine input NAND gate 102, in effect ORing these signals together. The output of the NAND gate 102 is provided to an input of a two input AND gate 103. A signal referred to as REFREQ output from the 82360 SL chip 22 is preferably provided to the other input of the AND gate 103, which is an inverted input. The REFREQ signal indicates, when asserted high, that a memory refresh operation is occurring. The inverted REFREQ signal is ANDed with the output of the NAND gate 102 to prevent memory refresh operations from being counted as cache read miss or write operations.

The output of the AND gate 103 is a signal referred to as CACHE__MISS, which is provided to the clock input of a 17 bit counter 104 referred to as the CAS* counter. The CACHE__MISS signal is therefore asserted when a main memory cycle occurs, which is whenever a cache read miss or a write operation occurs. The CAS* counter 104 is incremented each time the CACHE__MISS signal is asserted. The CAS* counter 104 outputs a signal referred to as CARRY which is provided through an inverter 106 to the seventh input of the NAND gate 102. The CARRY signal is asserted when the maximum number of counts is reached by the counter 104, which is $2^{17}$. When the CARRY signal is asserted, the CACHE__MISS signal is prevented from changing state and thus further counting by the counter 104 is disabled. The CAS* counter 104 provides data signals 1–16 to the inputs of a 16 bit flip-flop 108. Data signal 0 output from the CAS* counter is preferably left unconnected. The outputs of the flip-flop 108 are coupled to data bus signals referred to as DATA<0:15>, which are coupled to the CPU chip 20.

Address signals, a write/read (W/R) signal and a memory/ input output (M/IO) signal are output from the CPU chip 20 and provided to decode logic 110 in the activity monitor logic 70. The decode logic 110 outputs a signal referred to as RD__COUNT which is provided to a clock input of the flip-flop 108. The RD__COUNT signal is also provided through an inverter 111 to an inverted clear input of the counter 104 and to an inverted enable input of the flip-flop 108. Therefore, when the CPU chip 20 desires to read the counter 104, it outputs the appropriate address, the W/R signal and the M/IO signal to the decode logic 110, which then asserts the RD__COUNT signal to the counter 104 and the flip-flop 108. The asserted RD__COUNT signal enables the flip-flop 108 to latch in data from the counter 104 and transmit the data to the CPU chip 20 and simultaneously operates to clear the contents of the counter 104.

Figure 3:
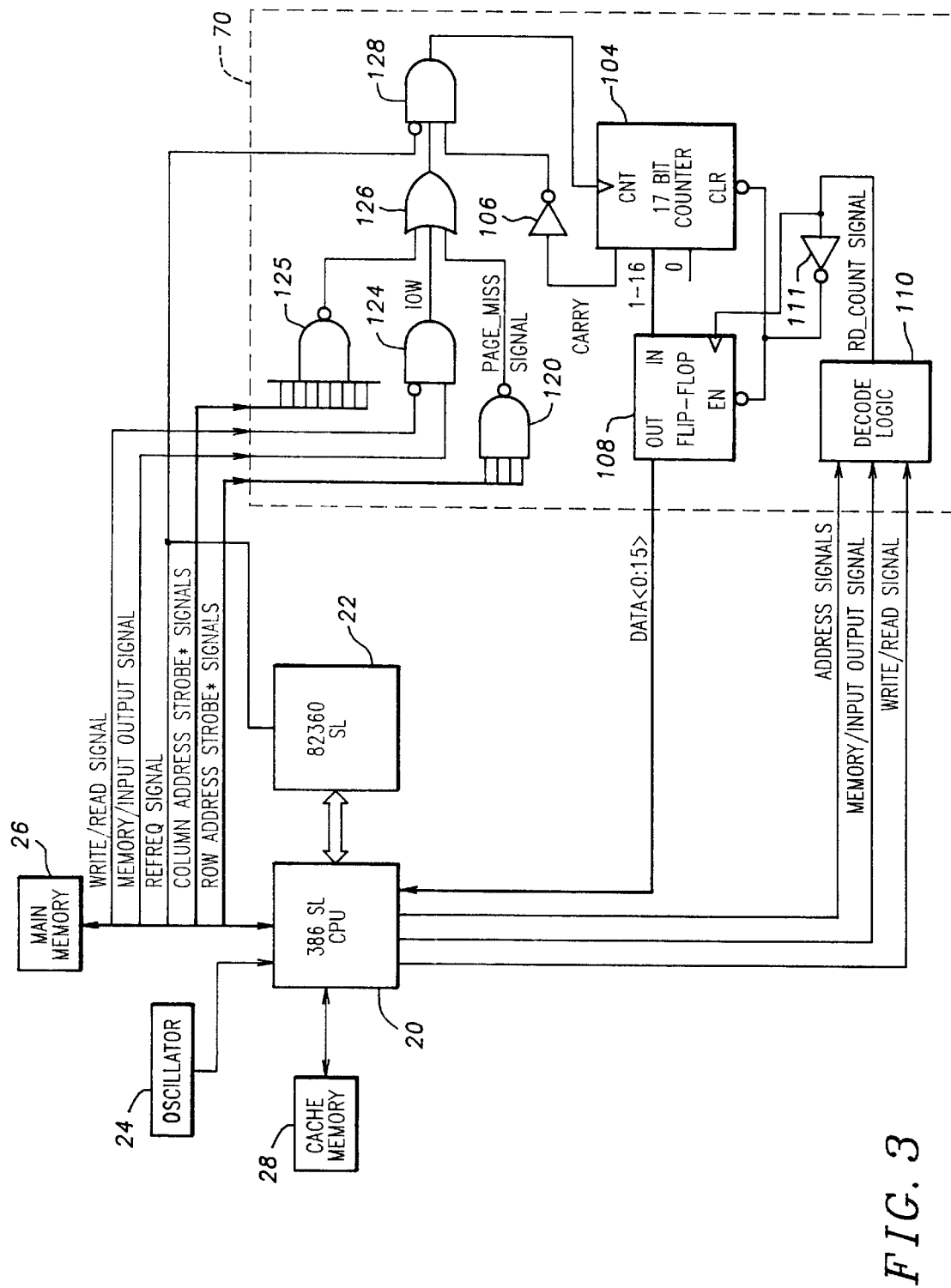
FIG. 3 is a schematic diagram of a portion of the computer system of FIG. 1 according to an alternate embodiment of the invention.

In an alternate embodiment, memory page misses and/or I/O write operations may also be counted. Memory page miss operations with the preferred microprocessor are determined by determining if any of the 4 row address strobe or RAS* signals are asserted low during non-refresh cycles. The asserted RAS* signals are indicative of page miss operations. As shown in FIG. 3, the RAS* signals are provided from the CPU chip 20 to the inputs of a four input NAND gate 120. The output of the NAND gate 120 is the page miss indication, which is referred to as the PAGE__ MISS signal. The I/O write indication is accomplished in the following manner. The W/R signal is connected to an input of a two input AND gate 124. The other input of the AND gate 124 is inverted and receives the M/IO signal. The output of the AND gate 124 generates a signal referred to as IOW which indicates, when asserted high, that an I/O write operation is occurring.

The PAGE__MISS and IOW signals are connected to inputs of a three input OR gate 126. The eight CAS* signals are connected to the input of an eight input NAND gate 125 whose output is connected to an input of the OR gate 126. The output of the OR gate 126 is connected to an input of a three input AND gate 128. A second input of the AND gate 128 receives the inverted CARRY signal. The third inverted input of the AND gate 128 receives the REFREQ signal. The output of the AND gate 128 is provided to the clock input of the counter 104. Therefore, during memory refresh operations or when the CARRY signal is asserted, the output of the AND gate 128 is negated low, and thus the counter 104 does not count at these times.

In this embodiment, cache read miss and write operations, page miss operations, and I/O write operations are all monitored as events. It is noted that any one of these events can be monitored either individually or in combination. In yet another alternate embodiment, each signal can be provided to separate counters arranged like the counter 104, and the outputs of the separate counters can be used to determine system activity.

The 82360 SL chip 22 includes an interrupt timer (not shown) which is used to generate time of day interrupts to the microprocessor approximately 18.2 times per second. The interrupt routine invoked by the timer is also used according to the preferred embodiment of the invention to periodically adjust the frequency of the clocking signal 25 received by the microprocessor, as is explained below.

Figure 4:
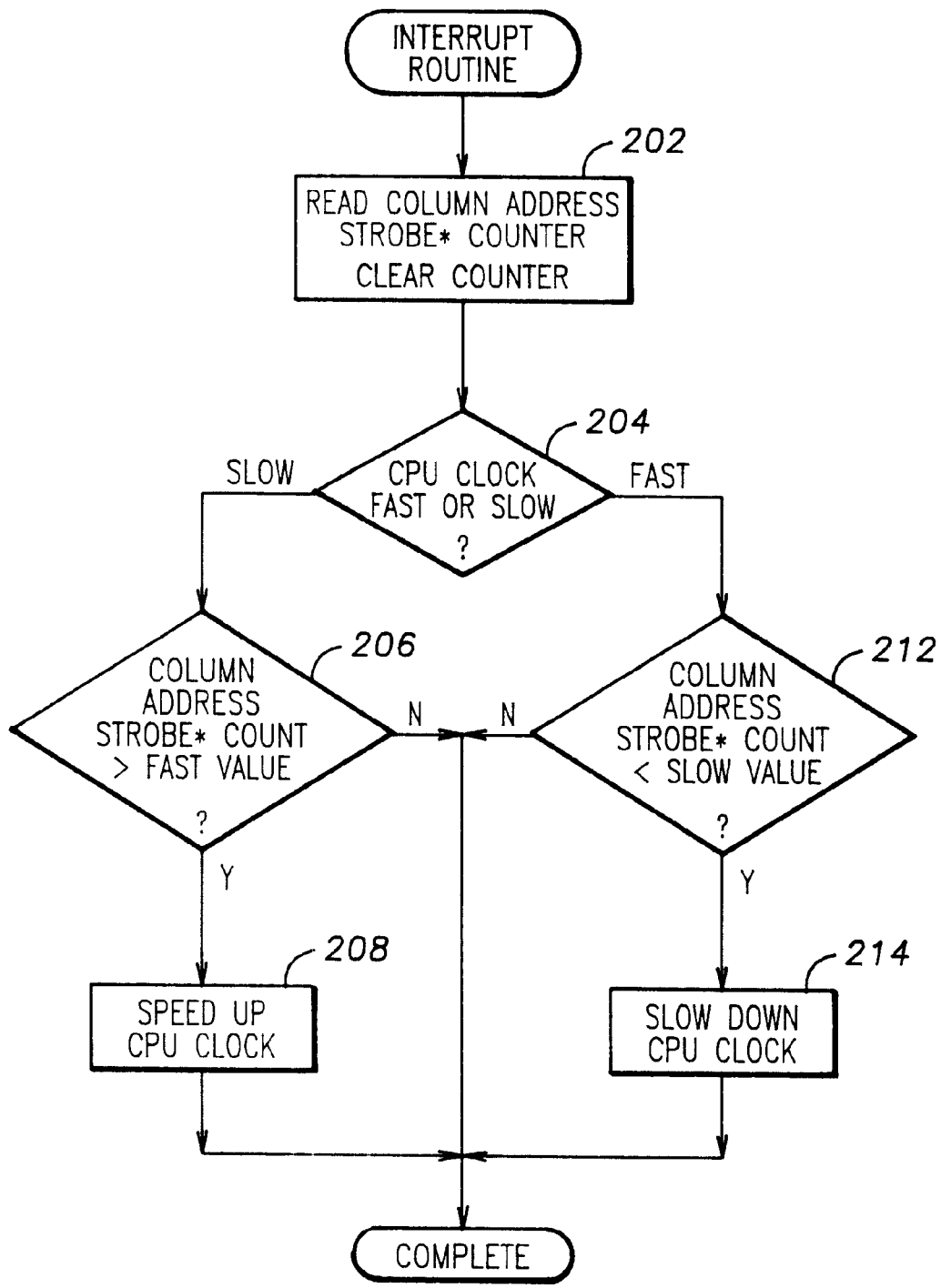
FIG. 4 is a flowchart diagram of a sequence for controlling the operation of the computer system of FIG. 1 according to the present invention.

Referring now to FIG. 4, a portion of the software routine that is executed when the time of day interrupt routine is invoked is shown. It is understood that the time of day interrupt routine may perform other operations than those shown. When the time of day interrupt signal is asserted, the CPU chip 20 reads the CAS* counter 104 in step 202. The counter 104 is also cleared in step 202. In an alternative embodiment, the separate counters providing the CAS* count, the memory page miss count, and the I/O write count are read in step 202. In step 204, the microprocessor reads bits 5 and 4 of the CPUWRMODE register to determine if the clock signal provided to the CPU chip 20 is operating at a fast or slow frequency. In the preferred embodiment, the microprocessor only writes either values 0,0 or 1,0 to bits 5 and 4, respectively, of the CPUWRMODE register, thus providing the clocking signal 25 at either fill frequency or one quarter frequency to the microprocessor. The CPUWRMODE register is programmed depending on the cache read hit rate as determined by the CAS* counter 104 in relation to certain comparison values. Thus, in this embodiment, the power management logic toggles between a full clock speed or fast speed, preferably 20 MHz, and a one quarter frequency clock speed or slow speed, preferably 5 MHz. However, it is noted that all four clock speed frequencies may be utilized.

If the clocking signal 25 provided to the CPU is determined to be operating at the slow speed in step 204, then in step 206 the microprocessor determines if the CAS* count value received from the CAS* counter 104 is greater than a fast comparison value stored inside the CPU chip 20. Alternatively, a function based on the three separate count values could be evaluated. If the CAS* count value exceeds the fast comparison value in step 206, then in step 208 the power management logic in the CPU chip 20 speeds up the clock signal 25 provided to the microprocessor to the full clock speed, and the routine completes. If the CAS* count value is not greater than the fast comparison value in step 206, then the interrupt routine completes.

If the clocking signal 25 provided to the microprocessor is determined to be operating at the fast speed in step 204, then control proceeds to step 212 where the microprocessor determines whether the CAS* count value is less than a slow comparison value stored in the CPU chip 20. If the CAS* count value is less than the slow comparison value in step 212, then the power management logic in the CPU chip 20 slows down the clocking signal 25 provided to the microprocessor in step 214 to one quarter speed, and the routine completes. If the CAS* count value is not less than the slow comparison value in step 212, then the routine completes.

The fast and slow comparison values are preferably programmable inside the CPU chip 20. In the preferred embodiment, the fast and slow comparison values are the same value. In an alternate embodiment, the slow comparison value is proportionally less that the fast value, i.e., one fourth less to reflect a true hit/miss ratio. In addition, since the comparison values can be user-adjusted inside the CPU chip 20, the values could be derived from characterization of common user applications.

As described above, the preferred embodiment utilizes the CPU chip 20 in "turbo mode" and uses software to perform the activity comparisons and speed changes. In an alternative embodiment, additional, registers can be used to contain the comparison values and an additional timer can be used to define the comparison interval. Hardware comparators are configured to perform the comparison logic described above at the appropriate time and change the state of the TURBO input based on the comparison to speed up or slow down the CPU chip 20 as appropriate.

Thus, the computer system according to the present invention monitors various power consumption related events, indicates certain changes to the user and enters an inactivity state upon an appropriate period of time after monitored system devices have been used.

The foregoing disclosure and description of the invention are illustrative and explanatory thereof, and various changes in the components, circuit elements, or flowcharts may be made without departing from the spirit of the invention.

I claim:

1. A computer system capable of operation in different power consumption modes, the computer system operating in a normal power consumption mode when the computer system is subject to a normal level of activity and operating in a reduced power consumption mode when the computer system is subject to a reduced level of activity, comprising:
   a processor;
   a mass storage device coupled to the processor; and
   a power management circuit coupled to the processor, the power management circuit adapted to reduce the power consumption of the computer system responsive to a rate of processor events being below a predetermined low event threshold and adapted to increase power consumption of the computer system responsive to the rate of processor events and being above a predetermined high event threshold, the power management circuit determining the rate of processor events based on processor signals.

2. The computer system of claim 1, wherein the processor operates at a system clock frequency, and wherein the power management circuit reduces power consumption by reducing the system clock frequency.

3. The computer system of claim 2, wherein the power management circuit increases power consumption by increasing the system clock frequency.

4. The computer system of claim 3, wherein the system clock frequency is adjustable to operate at a plurality of different system clock frequencies.

5. The computer system of claim 1, further comprising:
   a counter timer for determining the rate of processor events.

6. The computer system of claim 1, wherein the low event threshold and the high event threshold are the same value.

7. The computer system of claim 1, further comprising:
   cache memory coupled to the processor; and
   wherein the processor events comprise cache miss operations and memory write operations.

8. The computer system of claim 1, further comprising:
   cache memory coupled to the processor; and
   input/output devices coupled to the processor
   wherein the processor events are selected from the group consisting of cache miss operations and memory write operations, memory page miss operations and input/output write operations.

9. The computer system of claim 8, further comprising:
   decode logic coupled to the processor to select the type of processor event from which the rate of processor events is determined.

10. The computer system of claim 1, wherein the computer system is a portable computer.

11. A power management circuit for adjusting the power consumption in a battery operated computer, the battery operated computer operating at a system clock frequency, comprising:
   a counter-timer coupled to the battery operated computer for determining the rate of events;
   a memory for storing a predetermined low event threshold and a predetermined high event threshold; and
   a comparator coupled to the counter-timer and the memory, the comparator adapted to decrease the system clock frequency responsive to a rate of events being below the predetermined low event threshold and adapted to increase the system clock frequency responsive to the rate of events being above the predetermined high event threshold.

12. The power management circuit of claim 11, wherein the events are selected from the group consisting of cache miss operations of the battery powered computer and memory write operations of the battery powered computer, memory page miss operations of the battery powered computer and input/output write operations of the battery powered computer.

13. The power management circuit of claim 12, further comprising;
   decode logic coupled to the counter-timer and the battery operated computer, the decode logic to select the type of event from which the rate of events is determined.

14. The power management circuit of claim 11, wherein the comparator signals the battery powered computer to decrease the system clock frequency when the rate of events is below the predetermined low event threshold and when the system clock frequency is at least a fast system clock frequency.

15. The power management circuit of claim 11, wherein the comparator signals the battery powered computer to increase the system clock frequency when the rate of events exceeds the predetermined high event threshold and when the system clock frequency is less than a slow system clock frequency.

16. A computer system capable of operation in different power consumption modes, the computer system operating in a normal power consumption mode when the computer system is subject to a normal level of activity and operating in a reduced power consumption mode when the computer system is subject to a reduced level of activity, comprising:
   a processor operating at an adjustable system clock frequency;
   a memory coupled to the processor; and
   a power management circuit coupled to the processor, the power management circuit receiving the system clock frequency, comprising:
      a clock frequency divider receiving the system clock frequency, the system clock frequency divider capable of outputting different output system clock frequencies, the output system clock frequency being a new system clock frequency, the clock frequency divider adapted to reduce the output system clock frequency responsive to a rate of processor events being below a predetermined low event threshold and adapted to increase the output system clock frequency responsive to the rate of processor events being above a predetermined high event threshold.

17. The computer system of claim 16, the power management circuit further comprising:
   a comparator coupled to the clock frequency divider to determine when the rate of processor events is below a predetermined low event threshold and to determine when the rate of processor events exceeds a predetermined high event threshold.

18. The computer system of claim 16, further comprising:
   a counter timer for determining the rate of processor events.

19. The computer system of claim 16, wherein the reduced output system clock frequency is output from the clock frequency divider when the rate of processor events is below the predetermined low event threshold and when the system clock frequency is at least a fast system clock frequency.

20. The computer system of claim 16, wherein the increased output system clock frequency is output from the clock frequency divider when the rate of processor events exceeds the predetermined high event threshold and when the system clock frequency is below a slow system clock frequency.

21. The computer system of claim 16, further comprising:
   cache memory coupled to the processor; and
   wherein the processor events comprise cache miss operations and memory write operations.

22. The computer system of claim 21, the power management circuit further comprising:
   decode logic coupled to the processor, the decode logic to select the type of processor event from which the rate of processor events is determined.

23. The computer system of claim 16, further comprising:
   cache memory coupled to the processor; and
   input/output devices coupled to the processor
   wherein the processor events are selected from the group consisting of cache miss operations and memory write operations, memory page miss operations and input/output write operations.

* * * * *